United States Patent Office 2,861,096
Patented Nov. 18, 1958

2,861,096

2,3,6-TRICHLOROBENZYL ESTERS OF CHLOROACETIC ACIDS

Charles T. Pumpelly, Midland, Mich., assignor to The Dow Chemical Company, Midland, Mich., a corporation of Delaware No Drawing. Application November 2, 1956
Serial No. 619,961

3 Claims. (Cl. 260—487)

This invention relates to the 2,3,6-trichlorobenzyl esters of the chloroacetic acids having the formula

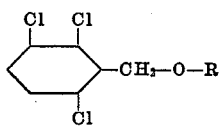

in which R represents a chloroacetyl radical. These compounds are viscous liquids or crystalline solids somewhat soluble in many organic solvents and of low solubility in water. They have been found to be active as herbicides and are adapted to be employed in dust and spray compositions for the control of the growth and the killing of weeds and for the sterilization of soil with regard to the growth of plants. They are also useful as parasiticides for the control of various insect and bacterial organisms.

The new compounds may be prepared by reacting 2,3,6-trichlorobenzyl alcohol with a chloroacetic acid such as monochloroacetic acid, dichloroacetic acid or trichloroacetic acid. The reaction may be carried out in the presence of an esterification catalyst such as sulfuric acid, toluene sulfonic acid or a cation exchange resin in the acid form, and conveniently in a water-immiscible solvent such as ethylene dichloride or toluene. The reaction takes place smoothly at the temperature range of from 75° to 180° C. The amount of reactants employed is not critical since some of the desired ester product is produced with any proportion of reactants. Good results are obtained when substantially equimolecular proportions of the reactants are employed. The employment of an excess of the chloroacetic acid and the removal of the water of reaction as formed generally results in optimum yields.

In carrying out the reaction, the alcohol, acid and catalyst, if employed, are mixed and the resulting mixture heated at a temperature of from 75° to 180° C. for a period of time to complete the reaction. In an alternative method, the reactants and catalyst, if employed, may be dispersed in the solvent and the resulting mixture heated at the boiling temperature. During the heating, a mixture of water of reaction and some of the solvent is continuously removed by distillation, condensed and the solvent recovered.

Upon completion of the reaction, the desired product may be separated by fractional distillation under reduced pressure. When the desired ester is a solid, it may be removed from the cooled reaction mixture by filtration and thereafter recrystallized from various organic solvents. Alternatively, the solvent mixture of the reaction product may be neutralized with an alkali such as dilute aqueous sodium carbonate. The resulting mixture divides into aqueous and solvent layers. The solvent layer which contains the ester reaction product is separated and washed several times with water. The washed mixture is then fractionally distilled under reduced pressure to separate the desired ester compound.

The following examples illustrate the invention but are not to be construed as limiting:

Example 1.—2,3,6-trichlorobenzyl trichloroacetate

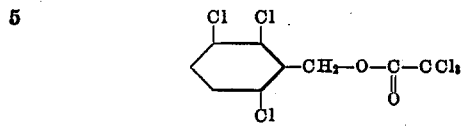

13.5 grams (0.064 mole) of 2,3,6-trichlorobenzyl alcohol and 16.3 grams (0.1 mole) of trichloroacetic acid were dissolved in 200 milliliters of ethylene dichloride and the resulting solution heated at the boiling temperature for 18 hours. The water of reaction was continuously removed as formed along with some of the solvent during the heating period. Following the heating period, the ethylene dichloride was removed by distillation under reduced pressure to obtain a 2,3,6-trichlorobenzyl trichloroacetate product as a solid residue. This product was washed with water and after drying was found to melt at 61°–62° C.

Example 2.—2,3,6-trichlorobenzyl chloroacetate

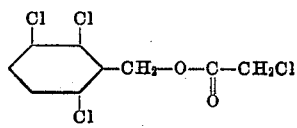

This compound was prepared by the method described in Example 1 by the reaction of 13.5 grams (0.064 mole) of 2,3,6-trichlorobenzyl alcohol and 9.4 grams (0.1 mole) of chloroacetic acid using ethylene dichloride as the solvent. The mixture was heated at the boiling temperature for 20 hours and the solvent thereafter removed by distillation at atmospheric pressure. The liquid residue was then fractionally distilled at reduced pressure to obtain a 2,3,6-trichlorobenzyl chloroacetate product as a viscous liquid boiling at 188°–191° C. at 0.2 millimeter pressure and having a refractive index n/D of 1.5722 at 25° C.

In a similar manner 2,3,6-trichlorobenzyl dichloroacetate may be prepared by the reaction of 2,3,6-trichlorobenzyl alcohol and dichloroacetic acid.

The new ester compounds of the present invention are effective as herbicides for the killing of weeds and the sterilization of soil with regard to plant growth. They are also valuable as parasiticides and are adapted to be employed for the control of insect and fungal organisms such as aphids. For such use the products may be dispersed on an inert finely divided solid and employed as dusts. Such mixtures may also be dispersed in water with or without the aid of a wetting agent and the resulting aqueous suspensions employed as sprays. In other procedures, the products may be employed as active toxic constituents in oil-in-water emulsions or aqueous dispersions with or without the addition of dispersing and emulsifying agents. In representative operations, good controls of the growth of the seeds and emerging seedlings of wild oats, radish and millet have been obtained with 2,3,6-trichlorobenzyl trichloroacetate when applied at the rate of 50 pounds per acre to soil previously planted with said plant species.

I claim:
1. A 2,3,6-trichlorobenzyl ester of a chloroacetic acid having the formula

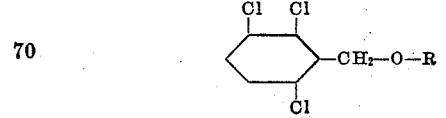

wherein R represents a member of the group selected from monochloroacetyl, dichloroacetyl and trichloroacetyl.

2. 2,3,6-trichlorobenzyl chloroacetate.
3. 2,3,6-trichlorobenzyl trichloroacetate.

References Cited in the file of this patent

UNITED STATES PATENTS

| 2,581,852 | Gilbert | Jan. 8, 1952 |
| 2,674,527 | Baumgartner | Apr. 6, 1954 |

OTHER REFERENCES

Lincoln et al.: Ind. Eng. Chem. 28 (1936), p. 1195.
Boissonas et al.: Chem. Abstracts 48 (1954), p. 4441C.